(12) United States Patent
Catapang et al.

(10) Patent No.: US 12,486,035 B2
(45) Date of Patent: Dec. 2, 2025

(54) AIRCRAFT GALLEY COMPARTMENT RETAINING ASSEMBLY

(71) Applicant: B/E Aerospace, Inc., Winston Salem, NC (US)

(72) Inventors: Mei De Guzman Catapang, Batangas (PH); Angelica Macalintal Jusi, Mabini (PH); Reivin Josel De Castro Mojica, Batangas (PH); Ma. Shierlalyn Grampil Malubag, Naujan (PH)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 19/011,353

(22) Filed: Jan. 6, 2025

(65) Prior Publication Data

US 2025/0236392 A1 Jul. 24, 2025

(30) Foreign Application Priority Data

Jan. 23, 2024 (EP) ..................................... 24153544

(51) Int. Cl.
*B64D 11/04* (2006.01)
(52) U.S. Cl.
CPC .................. *B64D 11/04* (2013.01)
(58) Field of Classification Search
CPC .... B64D 11/04; B64D 11/0007; B64D 88/14; B64D 90/0053; B61D 37/006; B63B 29/22
See application file for complete search history.

(56) References Cited

U.S. PATENT DOCUMENTS

| | | | |
|---|---|---|---|
| 9,821,911 B2 * | 11/2017 | Wallbott | B25J 1/08 |
| 10,472,068 B2 | 11/2019 | Coombs | |
| 11,167,926 B2 | 11/2021 | Vlaming et al. | |
| 2015/0070492 A1 * | 3/2015 | Hozumi | B64D 11/00 348/143 |

(Continued)

FOREIGN PATENT DOCUMENTS

JP 2015051741 3/2015

OTHER PUBLICATIONS

European Patent Office, European Search Report dated Jun. 25, 2024 in Application No. 24153544.2.

*Primary Examiner* — Joshua D Huson
*Assistant Examiner* — Shanna Danielle Glover
(74) *Attorney, Agent, or Firm* — SNELL & WILMER L.L.P.

(57) ABSTRACT

An aircraft galley compartment is provided. The galley compartment comprises a housing and a retaining assembly mounted to the housing. The housing defines a chamber configured to receive a container. The retaining assembly comprises an adjustment mechanism including a moveable part, a connecting rod, a linear to rotary gear arrangement disposed between the moveable part and a first end of the connecting rod, and a retaining lever fixedly attached to the connecting rod towards a second end thereof. The retaining lever is configured to pivot on rotation of the connecting rod between a first position and a second position in which the retaining lever protrudes into the chamber to engage a container therein. Linear movement of the moveable part causes rotation of the connecting rod and movement of the retaining lever between the first position and the second position.

15 Claims, 8 Drawing Sheets

(56) References Cited

U.S. PATENT DOCUMENTS

| | | | |
|---|---|---|---|
| 2019/0031348 A1* | 1/2019 | Bajorat | B64D 11/04 |
| 2019/0061950 A1* | 2/2019 | Hoogeveen | B64D 11/04 |
| 2021/0047042 A1 | 2/2021 | Tracey et al. | |
| 2022/0127001 A1 | 4/2022 | Chylinski et al. | |

* cited by examiner

AIRCRAFT GALLEY COMPARTMENT RETAINING ASSEMBLY

CROSS-REFERENCE TO RELATED APPLICATIONS

This application claims priority to EP Patent Application No. 24153544.2, filed Jan. 23, 2024 and titled "AIRCRAFT GALLEY COMPARTMENT RETAINING ASSEMBLY," which is incorporated by reference herein in its entirety for all purposes.

FIELD

The present disclosure relates to retaining assemblies such as for example, retaining assemblies for use in aircraft galley compartments.

BACKGROUND

The present disclosure relates to aircraft galley compartments and retaining assemblies for use in aircraft galley compartments. Such galley compartments may be used in commercial aircraft. In-flight catering services typically incorporate self-contained units or containers for storing or serving food and/or beverages prior to distribution to passengers. These containers must be secured in the galley compartment when stored to prevent movement and potential release of the container from the compartment, which could cause injury to people or damage to the galley.

In some applications such as, for example, in the aerospace industry, there is a need to produce galley compartment retainers which can provide a mechanism that provides a simple indication of whether the retainer is engaged to prevent movement of the container in the compartment. There is also a need for these mechanisms to be designed and constructed so as to reduce or to avoid risk of injury to galley users. There is also a need for these mechanisms to be designed and constructed so as to reduce or to avoid unintentional activation of the mechanisms.

SUMMARY

According to a first aspect of this disclosure, there is provided an aircraft galley compartment comprising a housing and a retaining assembly mounted to the housing, the housing defining a chamber configured to receive a container, the retaining assembly comprising: an adjustment mechanism including a moveable part: a connecting rod: a linear to rotary gear arrangement disposed between the moveable part and a first end of the connecting rod; and a retaining lever fixedly attached to the connecting rod towards a second end thereof, and configured to pivot on rotation of the connecting rod between a first position and a second position in which the retaining lever protrudes into the chamber to engage a container therein, wherein linear movement of the moveable part causes rotation of the connecting rod and movement of the retaining lever between the first position and the second position.

In any example of the disclosure, the linear to rotary gear arrangement may comprise a rack and pinion gear, or a roller pinion gear.

In any example of the disclosure, the adjustment mechanism may comprise a position indicator.

In any example of the disclosure, the moveable part may comprise a grip feature configured to allow the user to grip and move the moveable part. In any example of the disclosure, the grip feature may comprise a protrusion, indentation or ridge.

In any example of the disclosure, the moveable part may not protrude beyond the housing, and/or the galley compartment may further comprise a protective mount and the moveable part may not protrude beyond the protective mount.

In any example of the disclosure, the first position may be a stowed, disengaged position and the second position may be a latched, engaged position. In any example of the disclosure, the retaining lever may be moveable between the engaged and disengaged position.

In any example of the disclosure, the housing may comprise at least one panel.

In any example of the disclosure, the at least one panel may comprise a first panel, and the housing may comprise a second panel, spaced from and parallel to the first panel.

In any example of the disclosure, the housing may comprise a third panel perpendicular to the first and second panels. In any example of the disclosure, the housing may comprise a fourth panel spaced from and parallel to the third panel.

In any example of the disclosure, the retaining assembly may be mounted to one of the at least one panels.

In any example of the disclosure, the panel may be substantially hollow and at least part of the retaining assembly may be accommodated within the panel.

In any example of the disclosure, the panel may comprise an end face on which the adjustment mechanism is disposed.

In any example of the disclosure, the panel may comprise an aperture through which the retaining lever extends when in the second position.

In any example of the disclosure, the retaining assembly may comprise a mounting plate configured to attach the retaining assembly to the housing.

In any example of the disclosure, the moveable part may be linearly moveable between a first linear position in which the retaining lever is in the first position and a second linear position in which the retaining lever is in the second position.

BRIEF DESCRIPTION OF THE DRAWINGS

Certain examples of the disclosure will now be described by way of example only and with reference to the accompanying drawings in which.

DETAILED DESCRIPTION

Figure 1A:
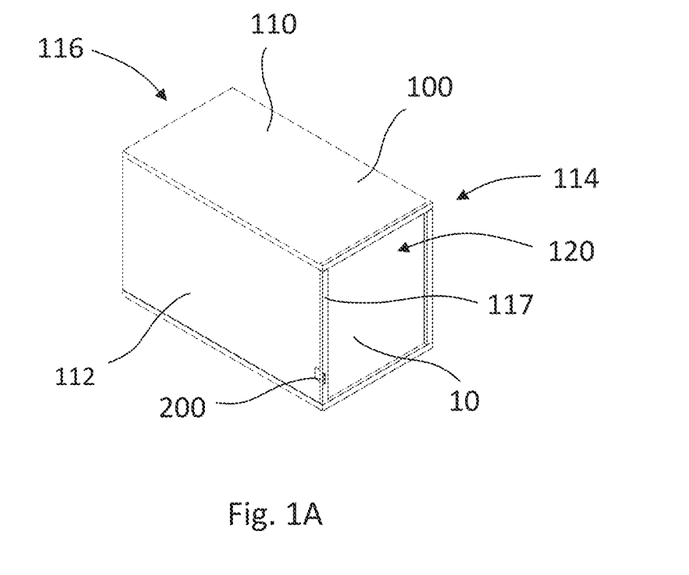
FIG. 1A is a front perspective view showing an aircraft galley compartment and container according to an example of the disclosure.
Figure 1B:
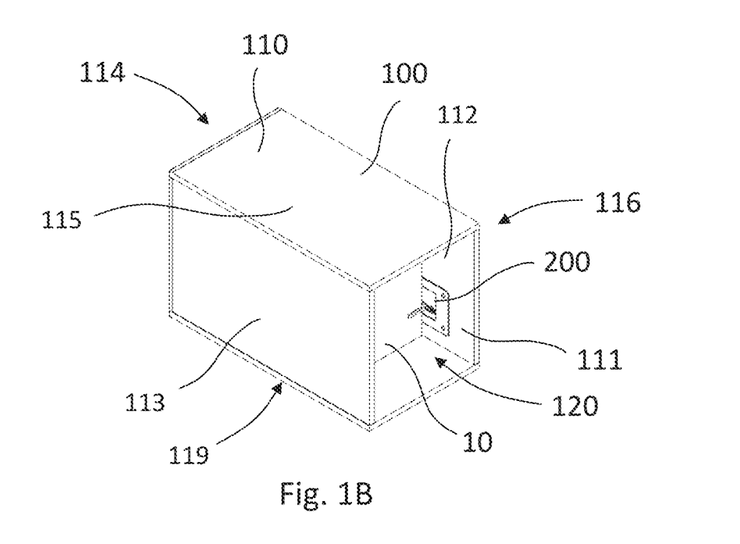
FIG. 1B is a rear perspective view showing the aircraft galley compartment and container of FIG. 1B.

In any example, and referring to the aircraft galley compartment shown in FIGS. 1A and 1B, the disclosure may provide an aircraft galley compartment 100 which has a retaining assembly 200 for retaining a container 10 within the compartment. The galley compartment 100 may be installed in an aircraft galley (not shown). In some examples one or more rows of compartments 100 may extend along a side wall (not shown) of the galley. In some examples, one or more of the compartments may be disposed within an aircraft galley monument (not shown). In some examples, the contents of the or each compartment are accessible by a user from the galley.

The compartment 100 comprises a compartment housing 110. The compartment housing 110 defines a compartment chamber 120, in other words a space is provided internally of the housing 110. The compartment housing 110 and the compartment chamber 120 may be cuboid in shape. The compartment housing 110 may comprise at least one panel. The compartment housing 110 may comprise four panels. The first and second panels may comprise side panels 112, 113. In some examples, the side panels 112, 113 are any of parallel, spaced from each other and opposite each other, disposed on opposing sides of the compartment chamber 120 from each other. In some examples and as shown, the third panel is a top panel 115 and the fourth panel is a base panel 119. The top and base panels 115, 119 may be any of parallel to each other, spaced from each other and disposed on opposing sides of the compartment chamber 120 from each other. The top and base panels 115, 119 may be perpendicular to the side panels 112, 113. The side panels 112, 113 may each comprise an inner face which abuts the chamber 120. Each of the top and base panels 115, 119 may each comprise an inner face which abuts the chamber 120.

The compartment chamber 120 receives a container 10. The compartment 100 has a first end 114 which is proximal to the user and faces the galley in use, and a second end 116 which is distal to the user in use. The first end 114 comprises an opening to the chamber 120. The container 10 can be inserted into and removed from the chamber through the opening in the first end 114. In some examples, the shape of the chamber 120 corresponds to the shape of the container 10. In some examples, the shape of the container may be smaller than the shape of the chamber in at least one dimension.

Figure 2:
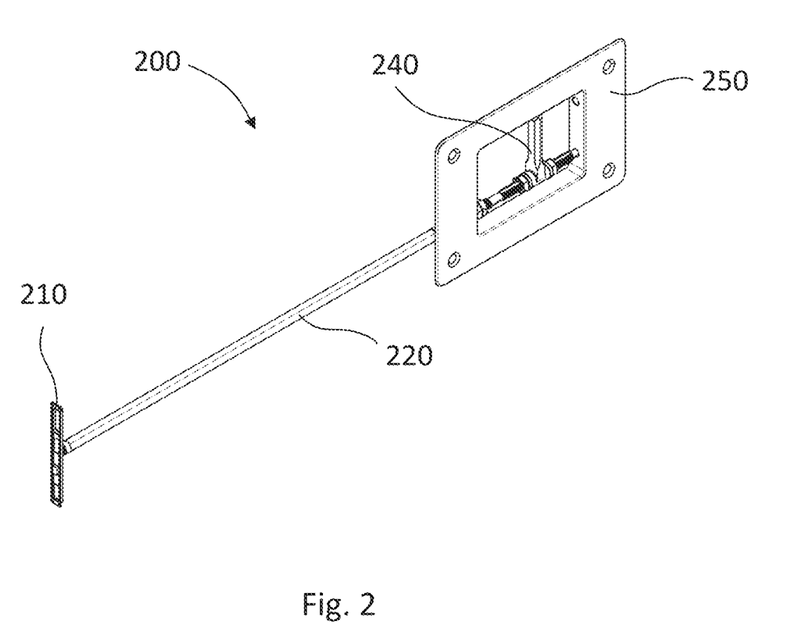
FIG. 2 is a perspective view of a retaining assembly according to an example of the disclosure.
Figure 3A:
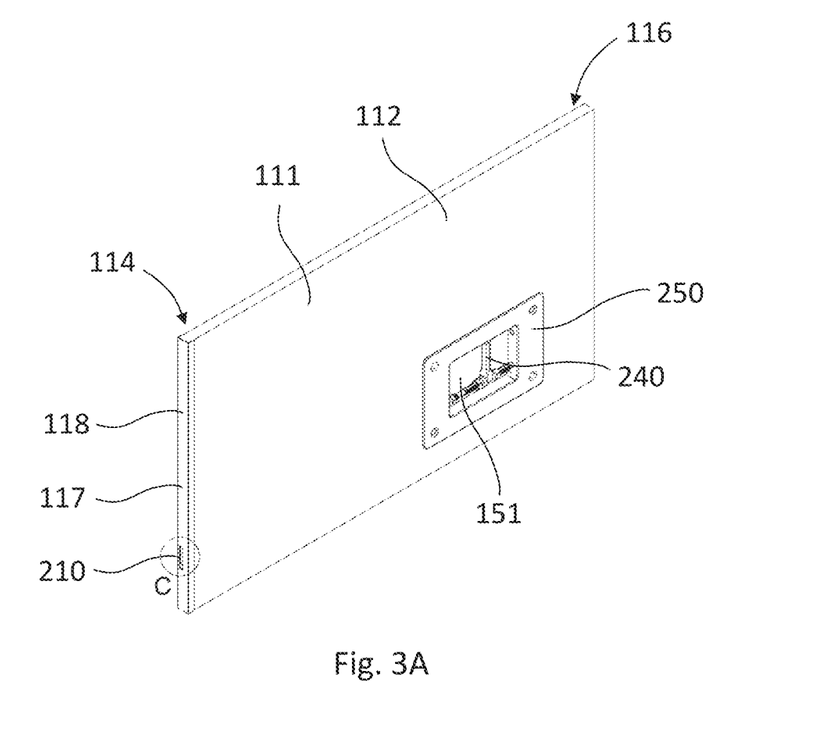
FIG. 3A is a perspective view of the retaining assembly of FIG. 2 in a compartment panel.
Figure 3B:
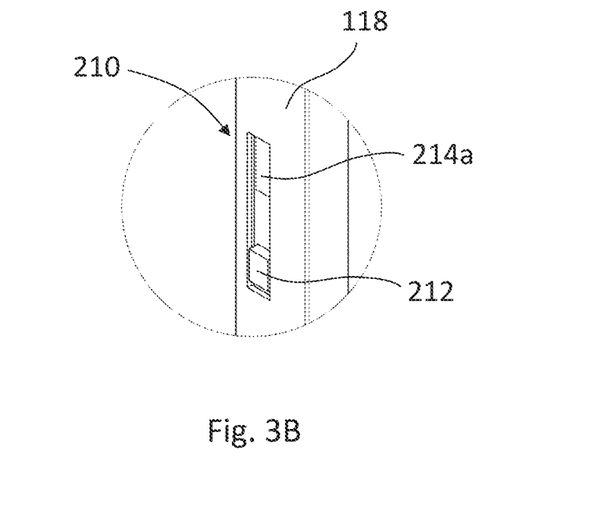
FIG. 3B is a close-up perspective view of C of FIG. 3A.
Figure 4:
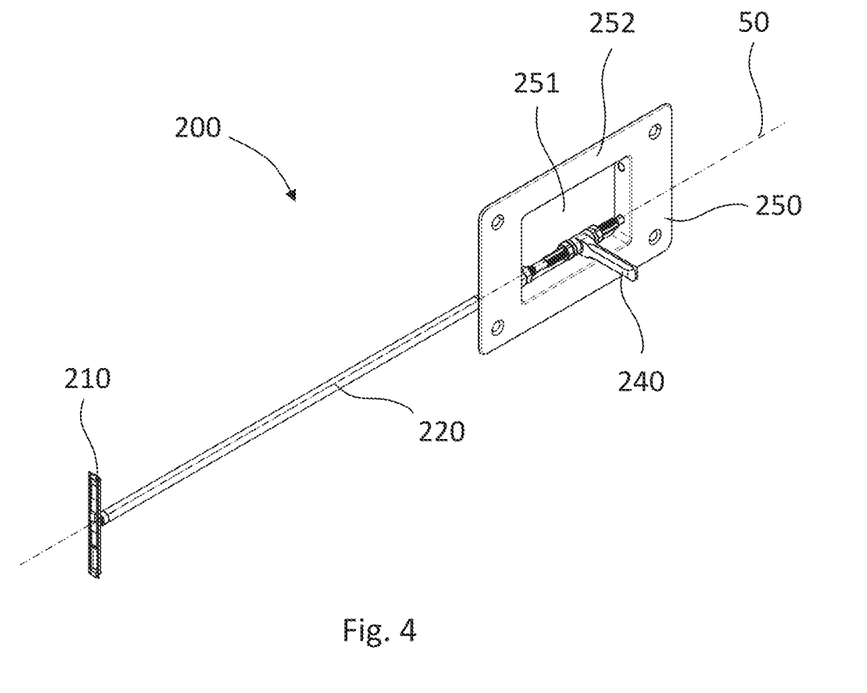
FIG. 4 is a is a perspective view of the retaining assembly of FIG. 2 in another position.
Figure 5A:
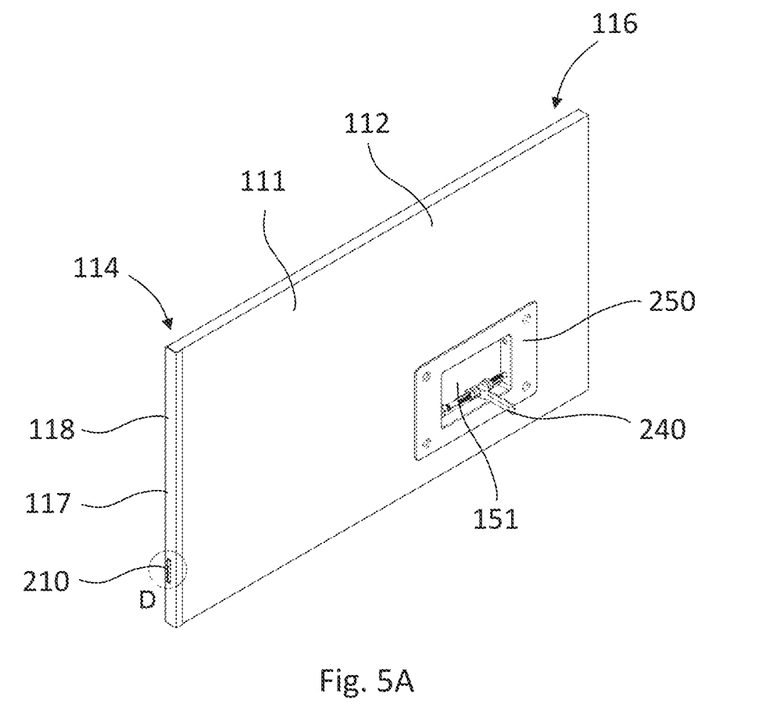
FIG. 5A is a perspective view of the retaining assembly of FIG. 4 in a compartment panel.
Figure 5B:
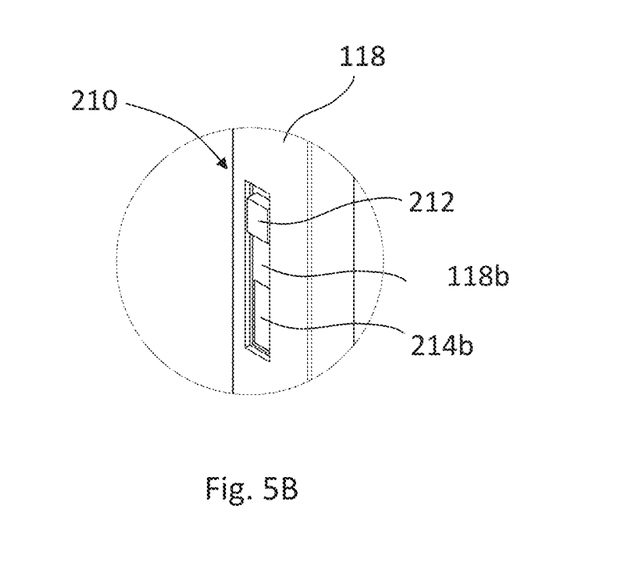
FIG. 5B is a close-up perspective view of D of FIG. 5A.

The galley compartment 100 comprises a retaining assembly 200 which is operable between a first position and second position. In the example shown, the retaining assembly 200 is provided in a side panel 112 of the compartment housing 110 but, in other examples, it could be provided in any of the housing panels, for example in any of a side panel, the top panel or the base panel. The first position is a stowed position or disengaged position in which, in some examples, the retaining assembly 200, in some examples the entire retaining assembly, is within the housing panel and the retaining assembly 200 does not interact with the container 10. The second position is an engaged position in which the container 10 is secured in the chamber 120 by the retaining assembly 200. In the engaged position, part of the retaining assembly 200 extends outwardly from the housing panel or, in other words, protrudes into the chamber 120. FIGS. 2, 3A and 3B show the retaining assembly in the first, stowed position, and FIGS. 4, 5A and 5B show the retaining assembly in the second engaged position. FIGS. 3A and 5A show the side panel 122 in isolation from the compartment 100.

The container 10 may take any suitable form. In any example, the container may be cuboid comprising six faces with at least four panels. The container may comprise at least one open face through which the user may access the container. The container may comprise a removable panel, an openable panel such as a hinged panel, or a lid through which the user may access the container.

In any example of the disclosure, the housing panels, in the example shown the side panels 112, 113, may have rails or channels (not shown) configured to interact with corresponding features on the container to aid insertion of the container 10 into the compartment chamber 120 and removal of the container 10 the compartment chamber 120.

The retaining assembly 200 comprises an adjustment mechanism 210 positioned at a first end 114 of the side panel 112 in the example shown. The adjustment mechanism 210 may be disposed on an end face 117 of the side panel 112. In any example of the disclosure, the adjustment mechanism may be configured to be flush with the housing. In any example of the disclosure, the adjustment mechanism may be configured to be flush with the housing panel to which it is mounted or secured. In any example of the disclosure, the adjustment mechanism may be configured to be flush with the first end of the housing panel at which it is positioned. In any example of the disclosure, the adjustment mechanism may be configured so as not to protrude beyond the housing and/or so as not to protrude into the galley. This reduces the risk of the adjustment mechanism being unintentionally activated or moved, or bumped into by a user, causing injury or damage to the adjustment mechanism. It also provides for improved aesthetic appearance of the compartment.

The galley compartment 100 of any example may comprise a protective mount which may form part of the housing, or part of the adjustment mechanism or which may be a separate, stand-alone component. In any example of the disclosure, the adjustment mechanism 210 and/or the moveable part described below may be configured to be flush with the protective mount. In any example of the disclosure, the adjustment mechanism and/or the moveable part described below may be configured so as not to protrude beyond the protective mount and/or so as not to protrude into the galley. This again reduces the risk of the adjustment mechanism being unintentionally activated or moved, or bumped into by a user, causing injury or damage to the adjustment mechanism. It also provides for improved aesthetic appearance of the compartment.

Figure 7A:
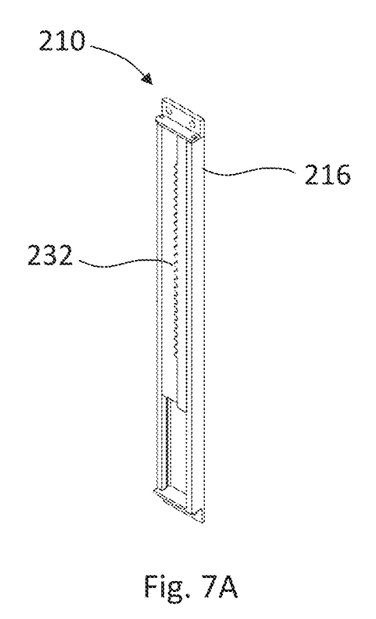
FIG. 7A is a rear perspective view from a first side of the moveable part of the adjustment mechanism according to an example of the disclosure.
Figure 7B:
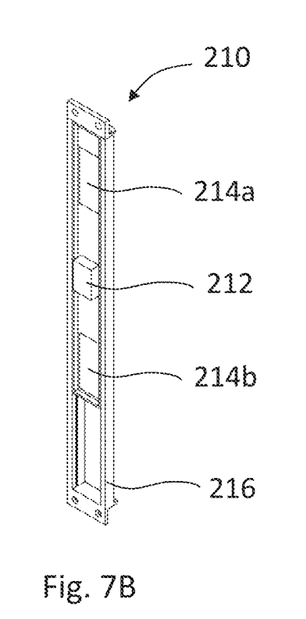
FIG. 7B is a front perspective view of the moveable part of the adjustment mechanism of FIG. 7A from a second side as seen from the galley.

The protective mount may be a frame 216, in which the adjustment mechanism 210 is disposed in some examples, as shown in FIGS. 7A and 7B. The frame 216 is mounted to the end face 117 of the side panel 112. In some examples, the frame may be mounted within the side panel 112. The adjustment mechanism 210 comprises a moveable part 212 and may also comprise a position indicator, which may be made up of first and second position indicators 214a, 214b as described further below. The moveable part 212 is positioned to be manually moveable by a user. The moveable part 212 is positioned to be accessible from the galley by the user. In any example of the disclosure, the moveable part may be configured to be flush with the frame 216. In any example of the disclosure, the moveable part may be configured so as not to protrude beyond the frame 216 and/or so as not to protrude into the galley. This reduces the risk of the adjustment mechanism being unintentionally activated or moved, or bumped into by a user, causing injury or damage to the adjustment mechanism. It also provides for improved aesthetic appearance of the compartment.

The moveable part may comprise a grip feature. The grip feature is configured to allow the user to grip and move the moveable part. The moveable part 212 may comprise a protrusion, indentation, ridge, or similar feature that is positioned to be accessible by the user to move the moveable part 212. The adjustment mechanism 210 is moveable linearly between a first position and a second position. In some examples, in the first position the moveable part 212 is moved towards the bottom of the frame 216 and in the second position the moveable part 212 is moved towards the top of the frame 216.

The retaining assembly 200 comprises a linear to rotary gear arrangement 230. The gear arrangement 230 is any suitable linear to rotary motion gear mechanism and may for example comprise a rack and pinion mechanism or a roller pinion mechanism. in some examples, the linear portion of the gear arrangement 230 is disposed on the adjustment mechanism and the rotary portion of the gear arrangement 230 is disposed on or connected to the connecting rod 220. In the example shown, the gear arrangement 230 comprises a rack 232 disposed on the adjustment mechanism 210, and a pinon 234. The rack 232 is fixed to and moveable with the moveable part 212. The pinion 234 is mounted to the rack 232 and has teeth 233 which engage with corresponding teeth 235 on the pinion 234. The pinion 234 is connected to the connecting rod 220 which extends towards a second end 116 of the compartment 100.

A retaining lever 240 is fixedly attached to the connecting rod 220 towards the second end thereof, in some examples towards the second end 116 of the compartment 100. The retaining lever 240 extends outwardly from the connecting rod 220 and, for example, may extend substantially perpendicular to the connecting rod 220. The retaining lever 240 is fixedly mounted to the connecting rod 220 such that rotation of the connecting rod 220 causes the retaining lever 240 to pivot. The connecting rod 220 rotates around its central, longitudinal axis 50. The retaining lever 240 pivots around the central axis 50 when moving between the first and second positions due to rotation of the connecting rod. The retaining lever 240 pivots between the first position and the second position such that it can be moved between either of the first and the second positions repeatedly. Movement of the retaining lever 240 between the first and second positions provides a substantially 90° rotation of the retaining lever 240. In some examples, the retaining lever rotates or pivots through up to 140°. In some examples and as shown in the drawings, the retaining lever 240 in the first, stowed position is substantially horizontal, and the retaining lever 240 in the second, engaged position is substantially vertical. The retaining lever 240 can be rotated both from the first position to the second position and from the second position to the first position.

The adjustment mechanism 210 is disposed at the first end 114 of the side panel 112 in the example shown. In any example, the housing panel may be substantially hollow and may accommodate the connecting rod 220 therein. The connecting rod 220 extends through the side panel 112 from the first end 114 of the compartment 100 towards a second end 116 of the compartment 100. The retaining lever 240 is disposed toward the second end 116 of the compartment 100.

The retaining assembly 200 is mounted or secured to the housing panel 112. In some examples, the connecting rod is secured to the panel 112. In the example shown, a mounting plate 250 is disposed towards a second end 116 of the panel 112 to secure the retaining assembly 200 to the panel 112. The panel 112 comprises an inner face 111 which faces the chamber 120 in use. The inner face 111 in some examples comprises a panel aperture 151 therethrough. The mounting plate 250 may be disposed on the inner face over the panel aperture 151. The mounting plate 250 in some examples comprises a surround 252 which fixes the mounting plate 250 to the inner face 111, and a mounting plate aperture 251 which aligns with the panel aperture 151 to allows the retaining lever 240 to protrude through and rotate through the panel aperture 151 and mounting plate aperture 251 into the compartment chamber 120. The mounting plate 250 is attached to the inner face of the side panel 112 over the side panel aperture 151 in some examples.

In the example of FIG. 3B, when the adjustment mechanism 210 is in the first position and the moveable part 212 is disposed towards the bottom of the frame, the first position indicator 214*a* of the position indicator is visible to the user. The first position indicator may be a color, such as green, to indicate that the adjustment mechanism is in the first position. When the adjustment mechanism 120 is in the second position as seen in the example of FIG. 5B, and the moveable part 212 is disposed towards the top of the frame, the second position indicator 214*b* of the position indicator is visible to the user. The second position indicator may be a color, such as red, to indicate that the adjustment mechanism is in the second position. The position indicator 214 provides easy indication to the user of the position of the adjustment mechanism 210 and therefore the retaining lever 240. This indicates to the user whether the container 10 is engaged in the chamber 120.

In some examples, the adjustment mechanism 210 and the first and second position indicators 214*a*, 214*b* are moveable relative to the frame 216 such that, in use, the user's view of the second position indicator 214*b* is obscured when the adjustment mechanism 210 is in the first position and the user's view of the first position indicator 214*a* is obscured when the adjustment mechanism 210 is in the second position. In some examples, the moveable part may be moveable relative to the first and second position indicators such that the moveable part obscures the position indicator that is not required to be shown. In some examples including the moveable part, the adjustment mechanism 210 is substantially flush to the end face 117 of the side panel 112. This reduces the risk of the adjustment mechanism being unintentionally activated or moved, or bumped into by a user, causing injury or damage to the adjustment mechanism. It also provides for improved aesthetic appearance of the compartment.

In the examples shown, when the adjustment mechanism 210 is moved linearly in a first direction from the first position to the second position, the rack 232 is also moved in the first direction. Movement of the rack 232 in a first direction causes rotational movement of the pinon 234, and therefore rotation of the connecting rod 220 in a first rotational direction. When the adjustment mechanism 210 is moved in a second direction from the second position to the first position, the rack 232 is also moved in the second direction. Movement of the rack 232 in the second direction causes rotational movement of the pinon 234, and therefore rotation of the connecting rod 220 in a second rotational direction, opposite to the first rotational direction.

Figure 8:
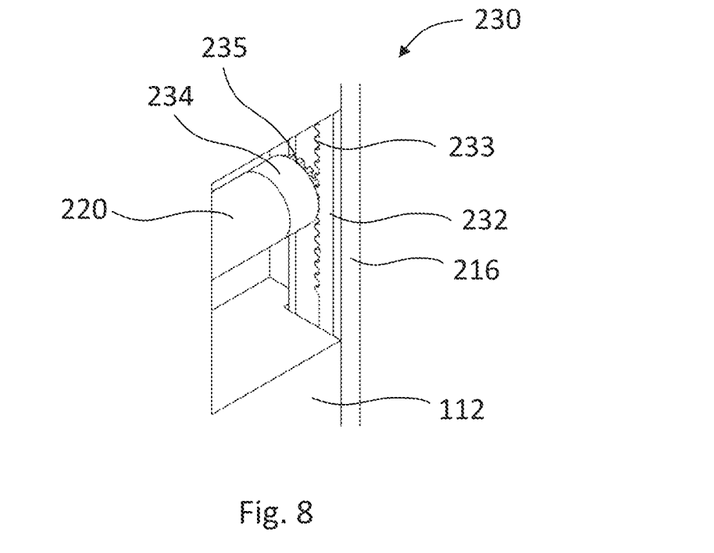
FIG. 8 is a rear perspective view of a portion of the linear to rotary gear assembly of the retaining assembly of FIGS. 2 and 4.
Figure 9:
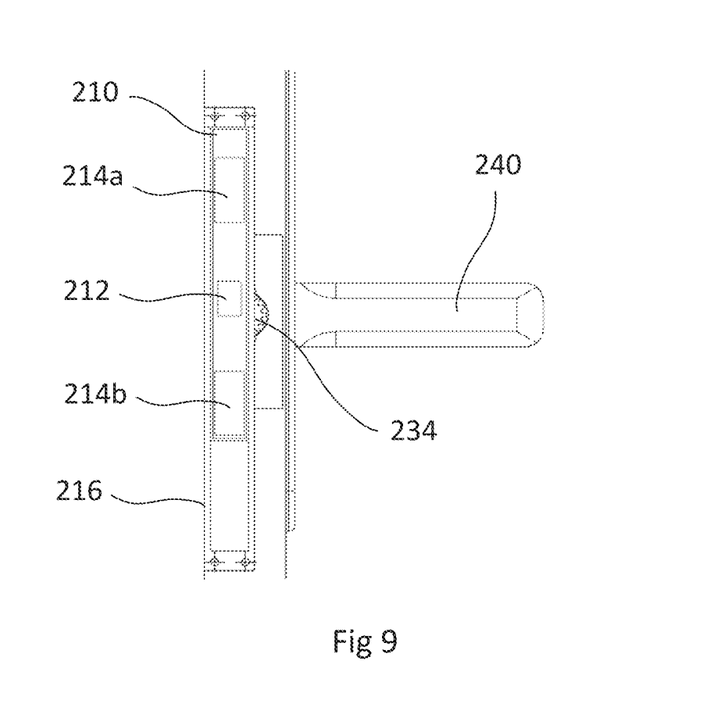
FIG. 9 is a cutaway view from the galley of the retaining assembly of FIG. 4.
Figure 10:
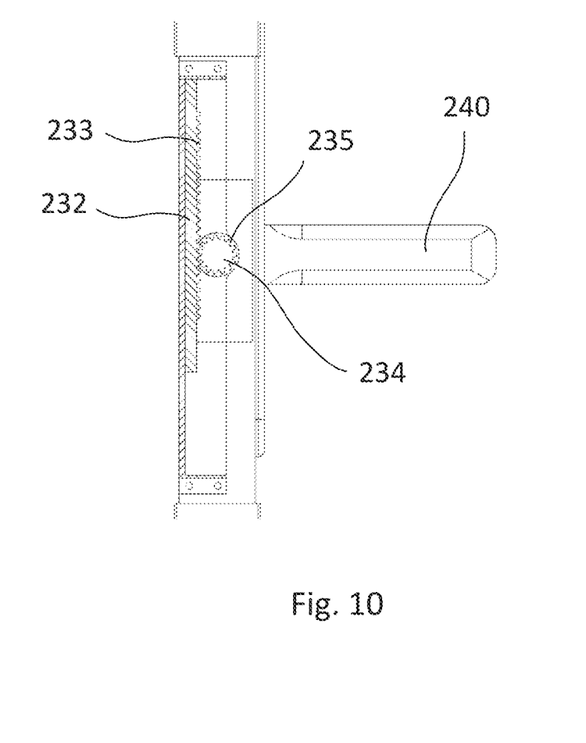
FIG. 10 is a cutaway rear view from the chamber of the retaining assembly of FIG. 4.

FIGS. 8 and 10 show a detailed view of the interaction between the rack and pinion of the gear assembly. The teeth 233, 235 engage such that linear movement of the rack 232 causes rotational movement of the pinion 234 and therefore rotation of the connecting rod 220. FIGS. 9 and 10 show the relationship between the adjustment mechanism 210 and the retaining lever 240 when the retaining assembly 200 is in the second, engaged position wherein the retaining lever 240 is positioned to engage with the container 10. FIGS. 9 and 10 show the adjustment mechanism 210 in the second position such that the retaining lever 240 is in the second, engaged position. In this example, the adjustment mechanism 210 is disposed towards the top of the frame 216 in the second position. In some examples, such as in FIG. 6, an end plate 118 which may form the or part of the protective mount is disposed over the frame 216 such that only a portion of the adjustment mechanism 210 is visible to the user. In any example including an end plate 118, the moveable part may be configured to be flush with the end plate 118. In any example of the disclosure, the moveable part may be configured so as not to protrude beyond the end plate 118 and/or so as not to protrude into the galley. This reduces the risk of the adjustment mechanism being unintentionally activated or moved, or bumped into by a user, causing injury or damage to the adjustment mechanism. It also provides for improved aesthetic appearance of the compartment.

As described above, the retaining lever is attached to the connecting rod 220 such that rotation of the connecting rod 220 causes the retaining lever to pivot around the central axis 50 of the connecting rod. The retaining lever 240 pivots around the axis 50 between a first position, and a second position. The first position corresponds to a stowed position, in which the retaining lever 240 is held within the side panel 112 and does not protrude into the compartment chamber 120. The second position corresponds to an engaged position, in which the retaining lever 240 protrudes through the mounting plate aperture to protrude into the compartment chamber 120. In the second position, the retaining lever 240 engages with a container 10 inserted into the chamber 120. When moving the adjustment mechanism 210 between the first and second position, the rack moves linearly with the adjustment mechanism (up and down in the example shown), causing rotation of the pinion gear and therefore rotating the connecting rod. The slide length of the adjustment mechanism 210 in the example shown corresponds to a 90° rotation of the connecting rod 220 and therefore a 90° rotation of the retaining lever 240 around the connecting rod central axis. The first position of the adjustment mechanism 210 corresponds to a first position of the retaining lever 240. The second position of the adjustment mechanism 210 corresponds to a second position of the retaining lever 240.

Figure 6:
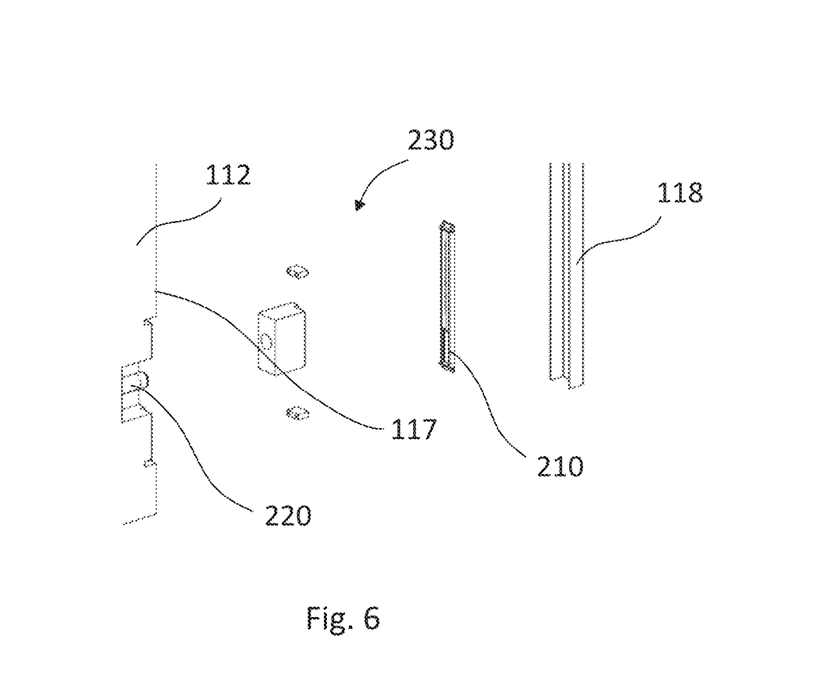
FIG. 6 is an exploded perspective view of an adjustment mechanism according to an example of the disclosure.

The adjustment mechanism 210 is disposed on the end face 117 of the side panel 112 in some examples. The frame 216 may secure the adjustment mechanism 210 to the end face 117. The side panel 112 comprises an end plate 118 at the first end 114. The end plate 118 attaches to the end face 117, as shown in FIG. 6. The end plate 118 in the example shown in FIG. 5B comprises an end plate aperture 118b which allows the adjustment mechanism 210 to be visible and operable through the aperture. The moveable part 212 is movable relative to the end plate 118 in some examples. In use, the end plate 118 obscures the user's view of the position indicator 214b when the adjustment mechanism 210 is in the first position. When the adjustment mechanism 210 is in the second position, the end plate obscures the user's view of the position indicator 214a. The end plate 118 provides protection of the frame from misuse by the user and an external environment, and protects the user from the moving parts of the adjustment mechanism 210.

The container 10 dimensions are at least slightly smaller than that of the chamber 120 so as to easily fit the container 10 into the chamber 120 in some examples. The retaining lever 240 length may be larger than any gap between the inner face of the panel and an outer surface of the chamber to ensure engagement of the retaining lever 240 with the container 10. The container 10 may comprise an engagement feature arranged to receive the retaining lever 240 to secure the container 10. The retaining lever 240 may interact with the rear of the container such that the container cannot be pushed any further into the chamber 120. The container 10 is inserted into the chamber 120 in one direction at the first end 114 and inserted towards the second end 116. Once in the engaged position, the retaining lever 240 prevents further movement of the container 10 towards the second end of the chamber 120. In some examples, the retaining lever prevents the container from sliding into or out of the container when in the engaged position.

It will be understood that in any example described herein, discussion of the adjustment mechanism and/or the moveable part protruding outwardly refer to a direction away from the chamber and/or towards the interior of the galley.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of disclosure. Additionally, while various examples of the disclosure have been described, it is to be understood that aspects of the disclosure may include only some of the described examples. Accordingly the disclosure is not to be seen as limited by the foregoing description, but is only limited by the scope of the appended claims.

The invention claimed is:

1. An aircraft galley compartment comprising a housing and a retaining assembly mounted to the housing,
   the housing defining a chamber configured to receive a container,
   the retaining assembly comprising:
   an adjustment mechanism including a moveable part;
   a connecting rod;
   a linear to rotary gear arrangement disposed between the moveable part and a first end of the connecting rod; and
   a retaining lever fixedly attached to the connecting rod towards a second end thereof, and configured to pivot on rotation of the connecting rod between a first position and a second position in which the retaining lever protrudes into the chamber to engage a container therein,
   wherein linear movement of the moveable part causes rotation of the connecting rod and movement of the retaining lever between the first position and the second position.

2. The galley compartment of claim 1, wherein the linear to rotary gear arrangement comprises a rack and pinion gear, or a roller pinion gear.

3. The galley compartment of claim 1, wherein the adjustment mechanism comprises a position indicator.

4. The galley compartment of claim 1, wherein the moveable part comprises a grip feature configured to allow the user to grip and move the moveable part, wherein, the grip feature comprises a protrusion, indentation or ridge.

5. The galley compartment of claim 1, wherein the moveable part does not protrude beyond the housing, and/or
wherein the galley compartment further comprises a protective mount and the moveable part does not protrude beyond the protective mount.

6. The galley compartment of claim 1, wherein the first position is a stowed, disengaged position and the second position is a latched, engaged position, and the retaining lever is moveable between the engaged and disengaged position.

7. The galley compartment of claim 1, wherein the housing comprises at least one panel.

8. The galley compartment of claim 7, wherein the at least one panel comprises a first panel, and the housing comprises a second panel, spaced from and parallel to the first panel.

9. The galley compartment of claim 8, wherein the housing comprises a third panel perpendicular to the first and second panels and a fourth panel spaced from and parallel to the third panel.

10. The galley compartment of claim 7, wherein the retaining assembly is mounted to one of the at least one panels.

11. The galley compartment of claim 10, wherein the panel is substantially hollow and at least part of the retaining assembly is accommodated within the panel.

12. The galley compartment of claim 10, wherein the panel comprises an end face on which the adjustment mechanism is disposed.

13. The galley compartment of claim 7, wherein the panel comprises an aperture through which the retaining lever extends when in the second position.

14. The galley compartment of claim 1, wherein the retaining assembly comprises a mounting plate configured to attach the retaining assembly to the housing.

15. The galley compartment of claim 1, wherein the moveable part is linearly moveable between a first linear position in which the retaining lever is in the first position and a second linear position in which the retaining lever is in the second position.

* * * * *